INVENTOR.
TADEUSZ BUDZICH

June 30, 1964  T. BUDZICH  3,138,908
CONTROL IN HARVESTING MACHINERY
Filed Sept. 1, 1960  4 Sheets—Sheet 3

INVENTOR.
TADEUSZ BUDZICH

June 30, 1964   T. BUDZICH   3,138,908
CONTROL IN HARVESTING MACHINERY
Filed Sept. 1, 1960   4 Sheets-Sheet 4

INVENTOR.
TADEUSZ BUDZICH

3,138,908
CONTROL IN HARVESTING MACHINERY
Tadeusz Budzich, 3344 Colwyn Road,
Cleveland 20, Ohio
Filed Sept. 1, 1960, Ser. No. 53,446
14 Claims. (Cl. 56—20)

This invention relates generally to harvesting machinery. In more particular aspects this invention relates to harvesting machinery of the self-propelled type. In still more particular aspects this invention relates to the control coordinating the ground speed of the harvesting machine with rate of feed of the crop to its harvesting mechanism.

The conventional machine of this type usually comprises a frame with attached wheels and an internal combustion engine mounted on the frame, this engine being maintained at a preselected speed by a suitable governor. This internal combustion engine drives at a fixed ratio the threshing and harvesting mechanism. A variable ratio transmission, usually of the variable V-belt type, is interposed between the engine, driven at a constant speed, and the wheels of the machine, so that, the operator may advance the machine over the field and change its speed depending on the density of the crop. Since the crop density in an average field varies considerably and since rate of feed of the crop to the threshing mechanism should be maintained at highest possible level where the efficiency of the threshing mechanism is high, the output and the time used in harvesting depends to a very great extent on the skill of the operator. To maintain the constant high rate of feed to the threshing mechanism the operator must increase the speed of the machine in a low density field and reduce the speed when a denser patch of the crop is reached to prevent over-loading and plugging of the harvesting mechanism. In the past several attempts were made to reduce the degree of skill required from the operator and increase the efficiency of the machine. In Patent Number 2,639,569 a device of such a nature is described. In it the ground speed of the machine is automatically varied in an inverse ratio to the manifold pressure developed by the constant speed engine. Although this method may appear as an efficient and convenient way of keeping the load on the threshing mechanism constant, this type of device suffers from one very serious disadvantage. Since the manifold pressure indicates directly the horsepower output of a constant speed governed engine, this device varies the speed of the combine to maintain a constant horsepower output of the engine. It is well known from practical experience that a harvesting machine of this type uses substantially more power in its propulsion across the fields than in its harvesting mechanism. The varying ground resistance when going uphill or downhill will influence the control to decrease or increase speed of the machine. With this type of control, in a field of absolutely uniform crop density, the load imposed on the threshing mechanism will vary with the ground resistance instead of remaining constant. This creates a dangerous situation especially with the machine travelling downhill when a great increase in load on the threshing mechanism may produce a complete plugging of the machine with potential damage to its components.

It is an object of the present invention to provide a simple and inexpensive control mechanism for maintaining uniform loading of the threshing mechanism by varying the ground speed of the harvesting machine, irrespective of the change in the ground resistance.

Another object is to provide an automatic control which will maintain a certain load on the harvesting mechanism as preselected by the operator by varying the ground speed of the machine.

Another object is to provide an automatic control maintaining constant torque input to the threshing mechanism with minimum change in construction of the conventional harvesting machine.

Another object is to provide an automatic control mechanism which with increase in ground resistance will maintain constant load at the threshing mechanism within the maximum available horsepower output of the engine by varying the ground speed and which will reduce the load on the threshing mechanism by reducing ground speed to keep this load within the range of available engine horsepower.

Another object is to provide an improved design of the mechanism providing torque input to the servo control.

Another object is to provide an automatic control which can be manually over-ridden by the operator while in operation.

Other objects and advantages will become apparent and the invention may be better understood from the consideration of the following description taken in connection with the accompanying drawings in which.

*Description*

Figure 1:
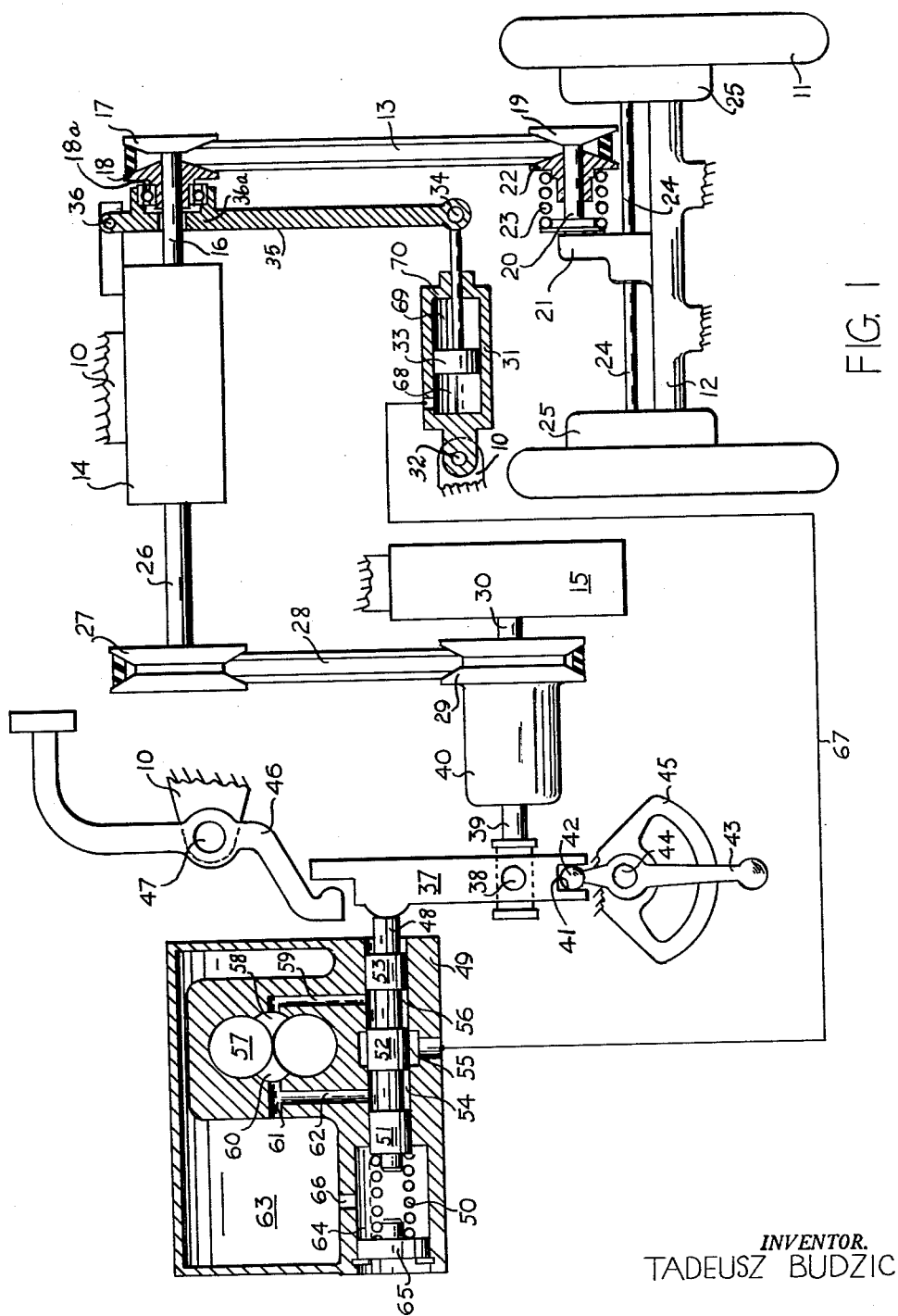
FIGURE 1 shows the diagrammatic layout of the components of the control and parts of the harvesting machine.

Referring to FIGURE 1, a combine harvesting machine consists of a frame 10, mounted on wheels 11 connected by an axle 12 and advanced through a crop by an engine 14 operationally connected to a harvesting mechanism 15. A drive shaft 16 of the engine 14 is equipped with an adjustable pulley which constitutes driving element of a variable ratio transmission. The adjustable pulley consists of a fixed disc 17, an axially slidable disc 18, guided on the drive shaft 16. A driven element of the variable ratio transmission consists of a disc 19 mounted on a disc shaft 20, connected to a diagrammatically shown gear train 21 and an axially slidable disc 22 and biasing spring 23. An endless belt 13, preferably of conventional V type, engages discs 17, 18, 19 and 22, transmitting power from the engine 14 to the gear train 21, mounted on the axle 12 and through gear box shafts 24 and step down gear boxes 25 to the wheels 11. The engine 14 through a shaft 26, a pulley 27, an endless belt 28, a torque pulley 29 and a torque shaft 30 drives the harvesting mechanism 15.

A hydraulic cylinder 31, tiltingly mounted by a hydraulic cylinder pin 32 on the frame 10, slidably retains a piston 33, connected by a piston pin 34 to a stroking lever 35. The stroking lever 35, pivoted on the engine 14 by a pin 36, in its enlarged end 36a carries a suitable bearing 18a, mounted on the slidable disc 18. A servo link 37 is rotatably pivoted by a servo link pin 38 on an extension 39, connected to torque sensing element 40 shown in greater detail in FIGURE 6. The extension 39 is mounted on the torque pulley 29 which drives the harvesting mechanism 15. One end of the servo link 37 with a slot 41 operationally engages a ball 42 of a manual control lever 43, rotatably mounted by a quadrant pin 44 on quadrant 45. The opposite end of the servo link 37 on one side engages a pedal 46, pivoted on a pedal pin 47 and on the other side a pilot valve spool 48, slidably retained in a control body 49 and biased by a pilot valve spring 50. The pilot valve spool 48 is equipped with three lands 51, 52 and 53 defining annular spaces 54, 55 and 56. A gear pump 57 in the control body 49 is equipped with a high pressure cavity 58. The high pressure cavity 58 is connected through a duct 59 to annular space 56. Low pressure cavity 60 of the gear pump 57 is connected to a reservoir 63 formed in the control body 49 by passage 61. A duct 62 connects the reservoir 63 with annular space 54. Cylindrical space 64, closed by a plug 65 is vented to the reservoir 63 by a passage 66. Annular space 55, formed in the control body 49, is connected by a duct 67 to space 68 inside the hydraulic cylinder 31. Space 69, of the hydraulic cylinder 31, is suitably vented by a passage 70.

Figure 6:
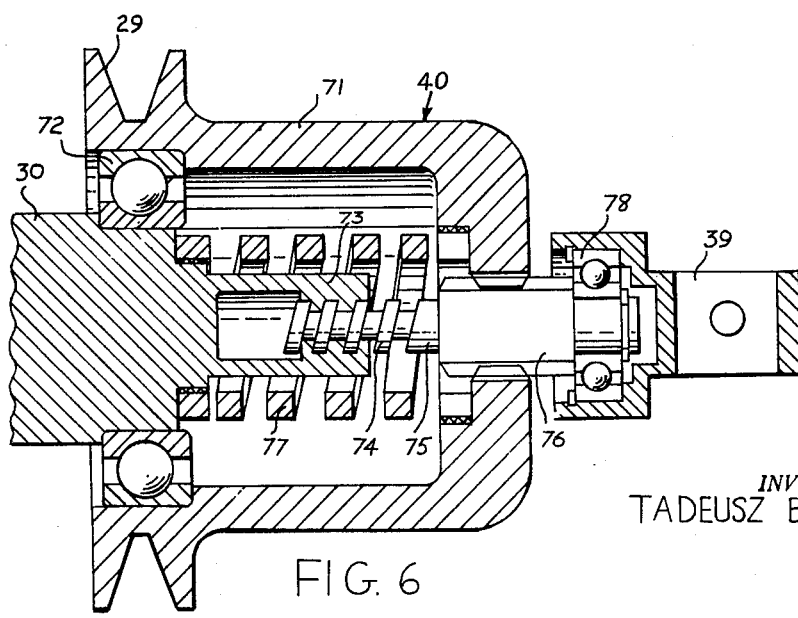
FIGURE 6 is a section elevation along line 6—6 of FIGURE 1 of the torque sensing device as shown in the diagrammatic drawing of the control in FIGURE 2.

The torque sensing element 40 of FIGURE 1, shown in detail in FIGURE 6, consists of a cylindrical body 71 integrated with torque pulley 29 and journalled on the torque shaft 30 by a suitable bearing 72. The torque shaft 30, with its extension 73, operationally engages a threaded portion 74 of an indicator 75 which with its splined end 76 is slidably keyed to the cylindrical body 71. A torsion spring 77 is secured to the torque shaft 30 and the cylindrical body 71. A bearing 78 is interposed between the indicator 75 and the extension 39.

Figure 4:
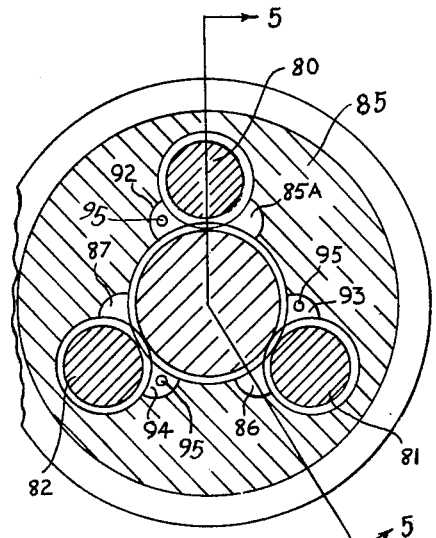
FIGURE 4 shows the section elevation of a modification of the hydraulic torque measuring device taken along line 4—4 of FIGURE 5.
Figure 5:
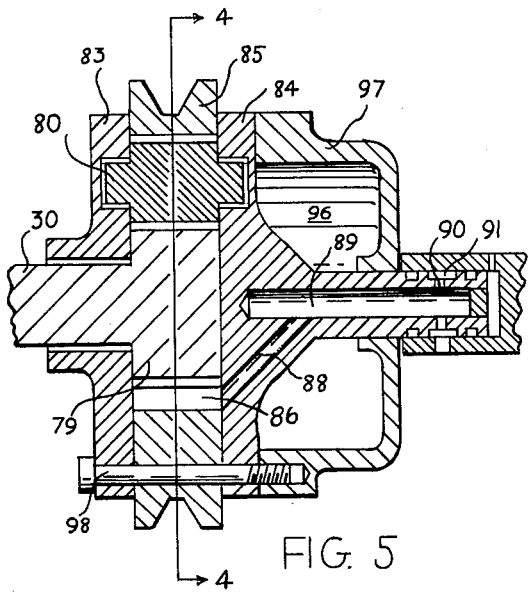
FIGURE 5 shows the end section through the hydraulic torque measuring device taken along line 5—5 of FIGURE 4.

A different type of torque sensing element from that shown in FIGURE 1 is shown in FIGURE 4 and FIGURE 5. The torque shaft 30 is equipped with a gear 79, working in operational engagement with pinions 80, 81 and 82, suitably retained in covers 83 and 84. The central disc 85 contains a circular recess, housing pinions 80, 81 and 82, and is equipped with a groove for accepting conventional endless belt. High pressure recesses 85a, 86 and 87 are connected with ducts 88 to a central passage 89 and through drillings 90 to a collector ring 91. Low pressure recesses 92, 93 and 94 are connected through plurality of passages 95 with the reservoir 96, defined by a cylindrical shell 97. The cylindrical shell 97 is secured to covers 83 and 84 and the central disc 85 by plurality of bolts 98.

Figure 2:
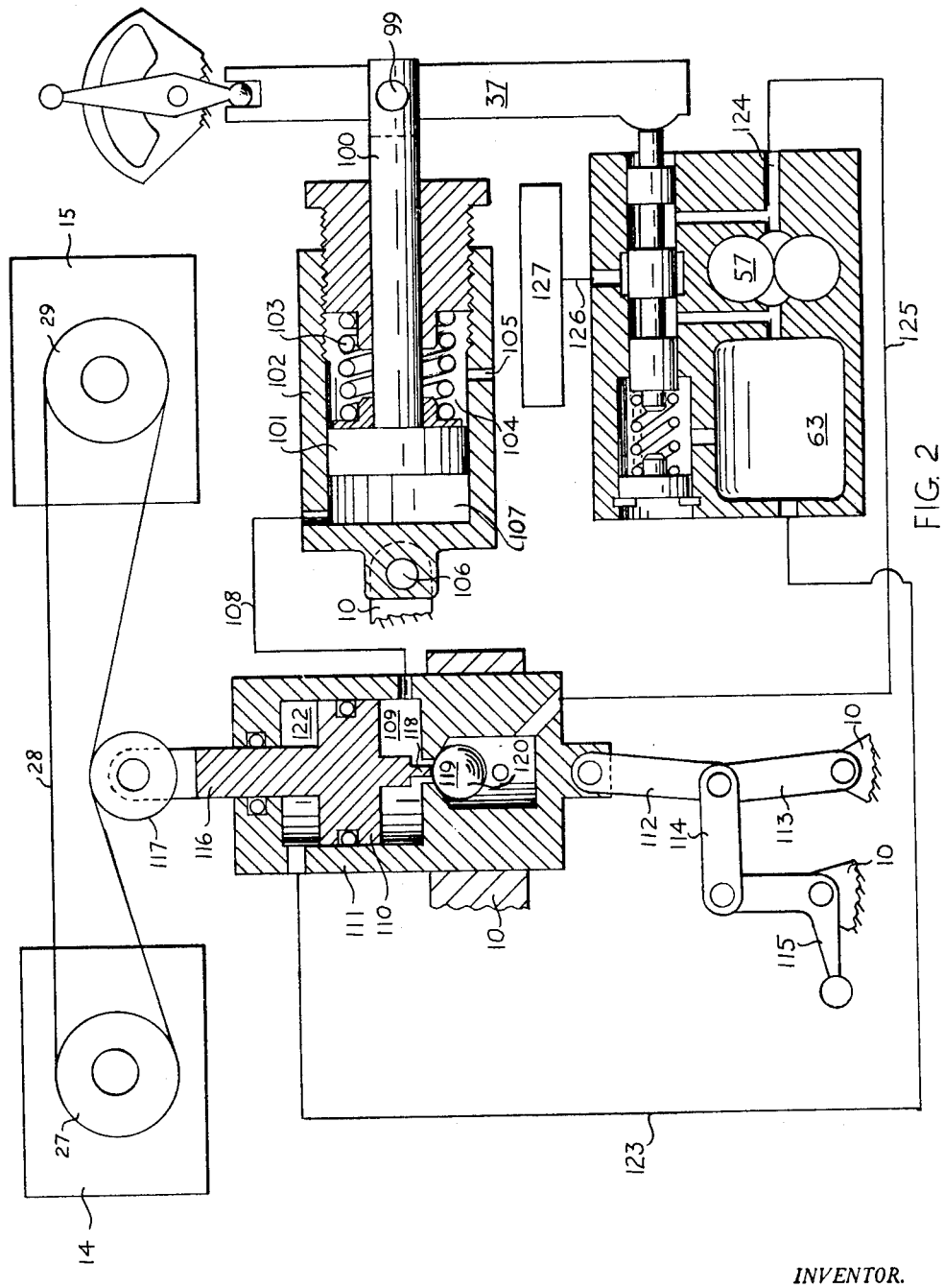
FIGURE 2 shows the diagrammatic layout of the control in FIGURE 1 but with different torque input to servo link.

FIGURE 2 shows a different type of torque sensing mechanism integrated into basic system as shown in FIGURE 1. The servo link 37 is pivoted by a pin 99 located on a stem 100 of a torque piston 101. The torque piston 101 is guided in a torque cylinder 102. A torque spring 103 is interposed between the torque piston 101 and the torque cylinder 102 in annular space 104, suitably vented by opening 105. The torque cylinder 102 is pivoted on the frame 10 by a torque cylinder pin 106. The fluid under pressure is supplied to space 107, defined by end of the torque piston 101, through duct 108 from annular space 109, defined by force piston 110 and the force cylinder 111. The force cylinder 111, slidably mounted in the frame 10, is moved axially by toggle linkages 112, 113 and 114 and a manually operated handle 115. The force piston 110, slidably mounted in the force cylinder 111 at one end on its elongated stem 116 carries an idler pulley 117. The idler pulley 117 when actuated by manually operated handle 115 engages the endless belt 28, connecting the pulley 27 of the engine 14 and the torque pulley 29 of the harvesting mechanism 15. The other end of the piston 110 with a force piston pin 118 engages intermittently a check valve 119 mounted in the force cylinder 111. Low pressure space 122 is connected in turn by a duct 123 with the reservoir 63. The gear pump 57 with a passage 124 and a duct 125 is connected to a check valve cavity 120. The control valve body 49 is connected by a duct 126 with a transmission ratio changing mechanism 127.

Figure 3:
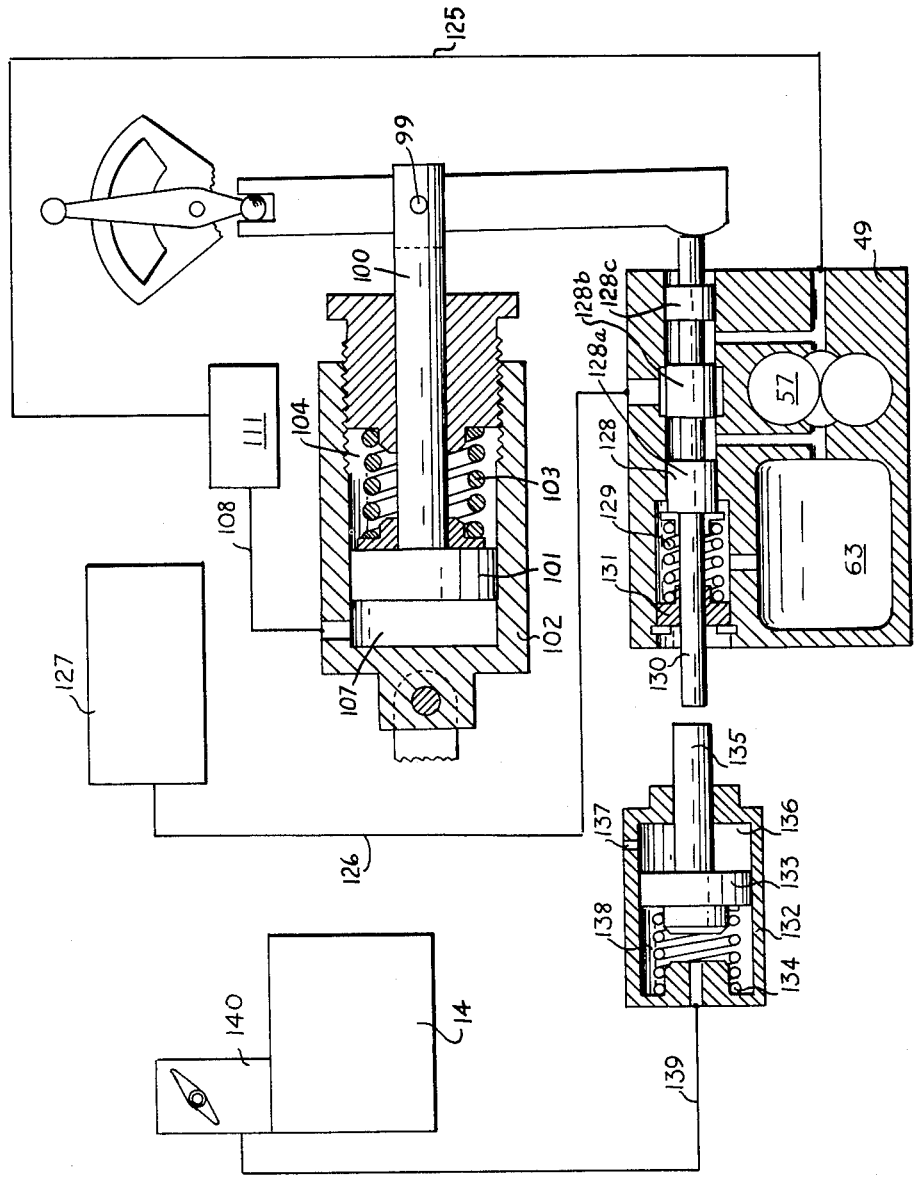
FIGURE 3 shows a modification of the control of FIGURE 2 with overriding horsepower limiting device.

In FIGURE 3 the torque cylinder 102 is connected by the duct 108 to the force cylinder 111, as shown in FIGURE 2. The control body 49, the reservoir 63 and the gear pump 57 are again the same as shown in FIGURE 2. A pilot valve 128, biased by a spring 129, is equipped with three lands 128a, 128b, and 128c and an elongated stem 130, which protrudes through a plug 131. A power cylinder 132 slidably retains power piston 133 biased by a spring 134. A rod 135, of a power piston 133, intermittently engages the elongated stem 130 of the pilot valve 128. Annular space 136 is vented by an orifice 137. Space 138 is connected by a duct 139 with a manifold 140 of the engine 14.

A self propelled combine of a conventional type basically consists of a frame 10, see FIGURE 1, which is advanced on wheels 11 through a crop by means of a constant speed governed engine 14. A harvesting mechanism 15 mounted on the frame 10 is driven by the engine 14 through a fixed ratio transmission. A variable ratio transmission consisting of two variable pitch, driving and driven pulleys, connected by an endless belt 13 is interposed between the drive shaft 16 and the wheels 11. A variable pitch driven pulley operated through a stroking lever 35 by piston 33, working inside a hydraulic cylinder 31. With space 68 connected to low pressure fluid, an axially slidable disc 22, guided by the disc shaft 20 will move under action of a spring 23 towards disc 19, increasing pitch diameter of the driven pulley. The endless belt 13 will then move the axially slidable disc 18 away from fixed disc 17, decreasing the pitch diameter of the driving pulley, causing the stroking lever 35 to turn about pivot 36 in an anticlockwise direction. The resulting movement of the piston 33 will displace some of the fluid from the space 68. The self-propelled combine is then driven at minimum ground speed, the reduction ratio between the engine 14 and wheels 11 being at its highest. An introduction of high pressure oil to the space 68 will move the piston 33 from left to right, displacing axially slidable disc 18, by stroking lever 35, towards fixed disc 17. This will automatically increase the pitch diameter of the driving pulley. The added tension in the endless belt 13 will overcome the preload in the spring 23, moving the axially slidable disc 22 away from disc 19, increasing the speed of the combine and decreasing the ratio of the transmission. Thus, when connecting the space 68 by a pilot valve either with source of high pressure oil or exhaust, the effective ground speed of the combine can be varied. A pilot valve spool 48 with its lands 51, 52 and 53 is biased by a spring 50. A movement to the right of the pilot valve spool 48 from its neutral position, as shown in FIGURE 1, will connect the annular space 55 and space 68 defined by the hydraulic cylinder 31 with a reservoir 63 thus, reducing ground speed of the combine. A movement of the pilot valve spool 48 to the left, against the force exerted by the spring 50, will connect space 68 with high pressure oil, increasing ground speed of the combine. The pilot valve spool 48 is operated by a servo link 37, slidably and rotatably mounted around a ball 42 of a lever 43 and rotatably mounted by a servo link pin 38 on an extension 39 of a torque sensing element 40 mounted on the harvesting mechanism 15. With an increase in torque transmitted to the harvesting mechanism 15 from the engine 14, the extension 39 of the torque sensing element 40 will move from left to right, the displacement from zero torque position being directly proportional to the magnitude of the torque transmitted. In FIGURE 1, the combine drive and the control are shown in a state of equilibrium, the harvesting mechanism 15 driven at torque level as set on a quadrant 54 by the lever 43. The land 52 of the pilot valve spool 48 is in its neutral position, cutting off the hydraulic cylinder 31 from the sources of low and high pressure oil. An increase in torque supplied to the harvesting mechanism 15, caused by increase in the rate of the crop being harvested, will move the extension 39 from left to right, turning the servo link 37 around the ball 42 in a clockwise direction, away from pilot valve spool 48. Under action of the spring 50 the pilot valve spool 48 will follow the servo link 37, connecting the hydraulic cylinder 31 with the reservoir 63. The spring 23 will then increase the transmission ratio, reducing the ground speed of the combine. The decrease in the ground speed of the combine will reduce the rate of feed of the crop to the harvesting mechanism, lowering the torque. The extension 39 will move from right to left bringing the land 52, of the pilot valve spool 48, to its neutral position, closing off the hydraulic cylinder 31. The combine will advance through the field at this reduced speed, maintaining constant torque at the harvesting mechanism 15, until an area of lower crop density is reached. With the reduction in the rate of feed and therefore of the torque required by the harvesting mechanism 15, movement of the servo link 37, actuated by extension 39, will connect hydraulic cylinder 31 with high pressure oil, increasing speed of the combine. Once the ground speed level is reached, at which the rate of feed of the crop to the threshing mechanism is equivalent to the torque setting on the quadrant 54, the extension 39 acting through servo link 37, will bring the pilot valve spool 48 into its neutral position as shown in FIGURE 1. The combine will continue to advance through the crop at this higher ground speed until the change in the crop density will activate the control to either increase or decrease the ground speed to maintain constant torque input and therefore constant rate of feed to the harvesting mechanism. The movement of the lever 43 of the quadrant 45 will effectively change the torque level at which the servo link 37 actuated by extension 39 of the torque sensing element 40, will bring the pilot valve spool 48 into its neutral position. In this way a controlled torque level and therefore the rate of feed of the crop to the harvesting mechanism can be changed from maximum to zero, each position of the quadrant lever being equivalent to different rate of feed of crop, which this control will automatically maintain by regulating the ground speed of the combine. With the lever 43 turned clockwise to its extreme position, the servo link 37 is rotated around servo link pin 38 away from the pilot valve spool 48 by a sufficient distance to make the automatic control completely ineffective. As a result the variable speed transmission of the combine can be manually operated by means not shown. With the control working, the position of the quadrant lever 43 can be moved manually. In this way the speed of the combine can be regulated by the operator through the basic mechanism of the control. Since each position of the quadrant lever in a field of uniform crop density represents a specific ground speed, a change in the position of the lever will proportionally change the ground speed of the combine. The automatic control feature is always superimposed over this manual operation maintaining at an instant the torque used in the harvesting mechanism at a level proportional to the setting in the quadrant 54. A foot pedal 46 is provided for the convenience of the operator using the automatic control. The action of the pedal is such that when depressed it moves the servo link 37 away from the pilot valve spool 48, reducing the speed of the combine. This feature is especially useful when a very low density of crop is encountered while using the automatic control at high torque setting. Under these conditions the automatic control will increase the ground speed of the combine to maximum to maintain the load on the harvesting mechanism. This may be dangerous and the operator by use of the pedal 46 may slow down the speed of the combine to the requirements of the ground surface condition without changing the setting of the automatic control. On release of the pedal 46 the automatic control will take over. This type of ararngement is especially useful with the torque sensing mechanism as shown in FIGURES 2, 3 and 4 where the forces involved in over-riding the control can be very small.

The torque sensing element 40, of FIGURE 1, is shown in detail in FIGURE 6. A cylindrical body 71, with the integral pulley 29, is journalled by a bearing 72 on the torque shaft 30, equipped with a shaft extension 73, engaging a threaded portion 74 of an indicator 75. The torsion spring 77 is retained against rotation on the torque shaft 30 and in the cylindrical body 71. The indicator 75 is slidably mounted by its splined section 76 in the cylindrical body 71. An anti-friction bearing 78 is interposed between the indicator 75 and the extension 39 shown in FIGURE 1. The torque from the engine is transmitted by the pulley 29 to the cylindrical body 71 and through the torsion spring 77 to the torque shaft 30, driving the harvesting mechanism. Under transmitted torque the spring 77 will angularly deflect, the angular deflection being proportional to the magnitude of the torque transmitted and will produce a relative rotation between the cylindrical body 71 and the torque shaft 30. This relative rotation will result in a linear motion of the indicator 75, its threaded portion 74 engaging the internal thread of the torque shaft extension 73. The linear displacement will produce a sliding motion between the splined end 76 of the indicator 75 and the cylindrical body 71. In this way a displacement, proportional to the magnitude of the torque transmitted to the harvesting mechanism will be transmitted to the extension 39, pivoting the servo link of the control.

FIGURE 2 shows a different solution of the torque sensing mechanism. In FIGURES 1 and 6 the torque signal to the servo link 37 is directly transmitted from the drive of the harvesting mechanism 15. In FIGURE 2 the torque signal is transmitted by a cylinder, piston and spring combination, activated by a pressure proportional to torque supplied from the torque sensing element. It is well known that the tension in the endless belt working on fixed pitch diameter pulleys is proportional to the torque transmitted by the belt. This principle is utilized in the construction of the torque sensing element. An idler pulley 117, rotatably mounted on an elongated stem 116, of a force piston 110, slidably retained in a force cylinder 111, engages endless belt 28, transmitting power from the engine 14 to the harvesting mechanism 15. A force piston pin 118 engages a check valve 119 connected by a duct 125 to the source of high pressure oil. The force cylinder 111 is advanced or retracted by a toggle linkage system operated manually by a handle 115. The components of the belt tension, acting on the idler pulley 117, move the force piston 110. The force piston pin 118 unseats the check valve 119, thus connecting annular space 109 with high pressure oil. Hydraulic pressure, acting on the effective area of the force piston 110, will move it outwards, the check valve 119 closing off the passage from the high pressure source. The pressure in the oil contained in the annular space 109 supports torque piston 101 and therefore is proportional to the force components of the belt tension and to the transmitted torque. The force piston 110 is maintained in a state of floating equilibrium, the check valve 119 maintaining its exact position by replenishing fluid lost by leakage. Annular space 109 is connected by a duct 108 to the torque cylinder 102, pivoted around a torque cylinder pin 106 and slidably engaging the torque piston 101. A torque spring 103 is interposed between the torque cylinder 102 and torque piston 101. A stem 100 of the torque piston 101 pivots by pin 90 the servo link 37, oil at pressure proportional to torque contained in space 107 moves torque piston 101 against force exerted by spring 103. The movement of the stem of torque piston 100 is then proportional to the transmitted torque. The operation of the servo link and control is the same as shown in FIGURE 1.

The torque sensing element, suitably guided in the frame 10, can be manually engaged or disengaged from the endless belt 28. The length of the endless belt is so arranged that when slack, with the torque sensing element disengaged, it will not permit power transmission from the engine 14 to the harvesting mechanism 15.

A still different type of torque sensing element is shown in FIGURES 4 and 5. As in the case of the torque sensing element, shown in FIGURE 2, this mechanism provides pressure signal proportional to torque transmitted from the engine to the harvesting mechanism. The torque shaft 30 terminates in a central gear 79, which engages multiplicity of pinions 80, 81 and 82, journalled by suitable bearings, between covers 83 and 84. A central disc 85, separating covers 83 and 84, is equipped with a groove, engaging an endless belt, connecting engine 14 and harvesting mechanism 15. A cylindrical shell 97 forms a reservoir 96 and is secured to the cover 84 by bolts 98. Low pressure oil is drawn from reservoir 96 through multiplicity of passages 95 to the low pressure side of conventional gear pump mechanisms formed by pinions 80, 81 and 82 and the central gear 79. High pressure recesses 85a, 86 and 87 are connected by ducts 88, a central passage 89 and a collector ring 91 to the cylinder, piston, spring combination, actuating the servo link 37 as shown in FIGURE 2. Since the discharge of multiplicity of the gear pumps is dead-ended, the discharge pressure will be proportional to the torque transmitted to the torque shaft 30 and the relative motion between central disc 85 and torque shaft 30 will be proportional to internal leakage of the mechanism and amount of oil used in displacing the force piston 101, see FIGURE 2.

FIGURE 3 shows a modification to the control as shown in FIGURE 1. The construction of the frame and combine drive are exactly the same as in FIGURE 1. The transmission ratio changing mechanism 127 and the force cylinder 111 are shown diagrammatically. The torque input to the servo link is the same as shown in FIGURE 2. The performance of this control in a range of low horsepower engine output is the same as shown in FIGURE 1. In a range of high horsepower output the action of a new mechanism is superimposed on the performance of the basic control of FIGURE 1, to prevent stalling of the engine. In a self propelled combine the engine provides not only the driving torque to the harvesting mechanism but, also the traction power. Under some circumstances the sum of these power requirements can exceed the capability of the engine. This may occur with the combine automatically controlled and working near the full capacity of the harvesting mechanism, encountering a very heavy ground resistance, say, when going uphill. The momentary power requirement to maintain constant rate of feed at harvesting mechanism may then overload the engine. The action of the mechanism as shown in FIGURE 3, when superimposed over the action of the basic control, will automatically adjust the ground speed to prevent overloading of the engine. Once the traction resistance will diminish, permitting normal operation of the control, the ground speed will be automatically increased to maintain the selected rate of feed of crop to the threshing mechanism.

The overload control as shown in FIGURE 3 consists of a power cylinder 132, slidably guiding a power piston 133, biased by a spring 134. The piston rod 135 can engage an elongated stem 130 of the pilot valve spool. Space 138 of the power cylinder 132 is connected by suitable duct 139 to the engine manifold 140. The preload in the spring 134 is such that at manifold vacuum of one inch or two inches mercury the differential forces acting on the piston 133 will keep the spring 134 in its compressed position, the rod 135 being out of contact with elongated stem 130 of the pilot valve. With the manifold pressure bearing smaller than one inch or two inches of mercury vacuum, the rod 135 will come in contact with the elongated stem of pilot valve moving it from left to right and in a manner as already described reducing the speed of the combine. Since the manifold pressure is proportional to the horsepower developed in the engine, a low manifold vacuum signifying high horsepower developed in the engine, will slow down ground speed of combine, preventing overloading of the engine and maintaining maximum horsepower developed equivalent to that of near full open throttle condition. In this way the basic control as shown in FIGURE 1 can never overload the engine, the overload control slowing the combine down to keep the sum of the horsepower used in the harvesting mechanism and the horsepower used in traction slightly below the maximum horsepower level the engine is capable of developing.

While I have illustrated and described a particular embodiment various modifications may obviously be made without departing from the true spirit and scope of this invention which I intend to have defined only by the appended claims taken with all reasonable equivalents.

I claim:

1. A machine for harvesting crop comprising; a structure means; a crop handling means in the structure means; a substantially constant speed power means driving at fixed ratio the crop handling means; a torque sensing means on the crop handling means adapted to sense the torque transmitted to the crop handling means independent of the torque transmitted to propel the structure; a variable speed propelling means driven by the substantially constant speed power means and arranged to advance the structure means through the crop, said variable speed propelling means including; a first and second adjustable pitch pulley; a belt means engaging the first and the second pulley; pitch changing means arranged to change the pitch of the first and second pulley; and an automatic control means responsive to the torque sensing means and operating the pitch changing means to maintain constant torque at the crop handling means by varying speed of the machine.

2. A machine for harvesting crop comprising; a structure means; a crop handling means in the structure means; a substantially constant speed power means driving at fixed ratio the crop handling means; a torque sensing means on the crop handling means adapted to sense the torque transmitted to the crop handling means independent of the torque transmitted to propel the structure; a variable speed propelling means driven by the substantially constant speed power means and arranged to advance the structure means through the crop, said variable speed propelling means including; a first and second adjustable pitch pulley; a belt means engaging the first and the second pulley; spring resilient means arranged to change pitch of the first and the second pulley; a fluid pressure actuating means opposing the spring resilient means; and an automatic control means responsive to the torque sensing means; and an adjusting means for varying the controlled torque level at the crop handling means by varying speed of the machine.

3. A machine for harvesting crop comprising; a structure means; a crop handling means in the structure means; a substantially constant speed power means driving at fixed ratio the crop handling means; a torque sensing means on the crop handling means adapted to sense the torque transmitted to the crop handling means independent of the torque transmitted to propel the structure; a variable speed propelling means driven by the substantially constant speed power means and arranged to advance the structure means through the crop, said variable speed propelling means including; a first and second adjustable pitch pulley; a belt means engaging the first and the second pulley; spring resilient means arranged to change pitch of the first and second pulley; a fluid pressure actuating means opposing the spring resilient means, said fluid pressure actuating means including a piston and cylinder combination; a source of fluid under pressure; a duct means for supplying fluid from the fluid source to the cylinder and automatically controllable means to vary relatively the supply of fluid from the pressure source to the cylinder to shift the cylinder and piston relatively for adjusting the variable speed propelling means to change its drive ratio in response to the torque sensing means.

4. A machine for harvesting crop comprising; a structures means; a crop handling means in the structure means; a substantially constant speed power means driving at fixed ratio the crop handling means; a torque sensing means responsive to torque transmitted to the crop handling means independent of the torque transmitted to propel the structure means; a variable speed propelling means driven by the substantially constant speed power means and arranged to advance the structure means through the crop, said variable speed propelling means including; a first and second adjustable pitch pulley; a belt means engaging the first and the second pulley; spring resilient means arranged to change pitch of the first and the second pulley; a fluid pressure actuating means opposing the spring resilient means and an automatic control means including; a link pivotally centered intermediate to its ends on the torque sensing means; a voluntary controllable torque selecting means engaging one end of the link; and a controllable means operable by the link to shift the fluid pressure actuating means for adjusting the variable speed propelling means to change its drive ratio in response to the torque sensing means.

5. A machine for harvesting crop comprising; a structure means; a crop handling means in the structure means; a substantially constant speed power means driving at fixed ratio the crop handling means; power sensing means on the constant speed power means; a torque sensing means on the crop handling means adapted to sense the torque transmitted to the crop handling means independent of the torque transmitted to propel the structure; a variable speed propelling means driven by the substantially constant speed power means and arranged to advance the structure means through the crop, a fluid pressure actuating means operating the variable speed propelling means and an automatic control means responsive to the torque sensing means and power sensing means and operating the fluid pressure actuating means to maintain constant torque at the crop handling means below predetermined power level by varying speed of the machine.

6. A machine for harvesting crop comprising; a structure means; a crop handling means in the structure means; a substantially constant speed power means driving at fixed ratio the crop handling means; power sensing means on the constant speed power means; a torque sensing means on the crop handling means adapted to sense the torque transmitted to the crop handling means independent of the torque transmitted to propel the structure; a variable speed propelling means driven by the substantially constant speed power means and arranged to advance the structure means through the crop, said variable speed propelling means including; a first and second adjustable pitch pulley; a belt means engaging the first and the second pulley; spring resilient means arranged to change pitch of the first and the second pulley; a fluid pressure actuating means operating the variable speed propelling means and an automatic control means responsive to the torque sensing means and power sensing means and operating the fluid pressure actuating means to maintain constant torque at the crop handling means below predetermined power level by varying speed of the machine and an automatic control means responsive to the torque sensing means and power sensing means; and an adjusting means for varying the controlled torque level at the crop handling means below predetermined power level by varying speed of the machine.

7. A machine for harvesting crop comprising; a structure means; a crop handling means in the structure means; a substantially constant speed power means driving at fixed ratio the crop handling means; power sensing means on the constant speed power means; a torque sensing means on the crop handling means adapted to sense the torque transmitted to the crop handling means independent of the torque transmitted to propel the structure; a variable speed propelling means driven by the substantially constant speed power means and arranged to advance the structure means through the crop; a fluid pressure actuating means operating the variable speed propelling means and an automatic control means including; a link pivotally centered intermediate to its ends on the torque sensing means; a voluntary controllable torque selecting means pivotally and slidably engaging one end of the link; power sensing means engaging the link; and a controllable means operable by the link to shift the fluid pressure actuating means for adjusting the variable speed propelling means to change its drive ratio in response to the torque sensing means below predetermined power level.

8. A machine for harvesting crop comprising; a structure means; a crop handling means in the structure means; a substantially constant speed power means driving at fixed ratio the crop handling means; a variable speed propelling means driven by the substantially constant speed power means and arranged to advance the structure means through the crop, said variable speed propelling means including; a first and second adjustable pitch pulley; a belt means engaging the first and the second pulley; spring resilient means arranged to change pitch of the first and the second pulley; a fluid pressure actuating means opposing the spring resilient means; a torque sensing means responsive to torque transmitted to the crop handling means independent of the torque transmitted to propel the structure means, said torque sensing means including shaft means operably connected to said crop handling means, power transmitting means journalled with respect to said shaft means, said shaft means and said power transmitting means being relatively rotatable, resilient means interposed between said shaft means and said power transmitting means adapted to transmit the torque from power transmitting means to the shaft means, and indicating means responsive to the relative angular position of the power transmitting means and the shaft means, and an automatic control means responsive to the indicating means and operating the fluid pressure actuating means to maintain torque at the crop handling means by varying speed of the machine.

9. A machine for harvesting crop comprising; structure means; a crop handling means in the structure means; a substantially constant speed power means; tension pulley means engaging said transmission belt means connecting said constant speed power means and the crop handling means; a variable speed propelling means driven by the substantially constant speed power means and arranged to advance the structure means through the crop; means to sense the force applied from said transmission belt to said tension pulley and translate said force into fluid pressure, indicating means to translate said fluid pressure to mechanical motion proportional to said force applied to the tension pulley, and automatic control means responsive to said indicating means and operably connected to said fluid pressure actuating means to maintain constant selected force transmitted to said crop handling means by varying the speed of the machine.

10. A machine for harvesting crop comprising; a structure means; a crop handling means in the structure means; a substantially constant speed power means driving at fixed ratio the crop handling means; a variable speed propelling means driven by the substantially constant speed power means and arranged to advance the structure means through the crop; a fluid pressure actuating means operating the variable speed propelling means; a torque sensing means responsive to torque transmitted to the crop handling means; said torque sensing means including; a shaft means driving the crop handling means; a central gear means on the shaft means; a fixed ratio pulley rotatably mounted on the shaft means; multiple gear means journalled in the fixed ratio pulley and meshing with the central gear; a cover means forming a chamber mounted on the fixed ratio pulley and containing a fluid; duct means to connect the chamber and the multiple gear means; a fluid collecting means; a central passage conducting fluid from the multiple gear means to the fluid collecting means; a torque measuring cylinder piston combination; a spring biasing the torque measuring piston; a duct means conducting fluid at a pressure proportional to torque from the fluid collecting means to the torque measuring cylinder; and an automatic control means responsive to the torque sensing means and operating the fluid pressure actuating means to maintain torque at the crop handling means by varying speed of the machine.

11. In a machine for harvesting crop which includes structure means, power means operable at substantially a constant speed, variable ratio transmission means operably connected to said power means and adapted to propel the structure means at variable ground speed, crop handling means driven at substantially a constant speed by said power means, the improvement which comprises, torque sensing means adapted to sense the torque transmitted from said power means to said crop handling means independent of the torque transmitted to propel the structure, and means responsive to the torque sensing means and operably connected to the transmission means to vary the ground speed of the structure to maintain a constant torque transmitted from the power means to the crop handling means.

12. In the device of claim 11 the provision of means for adjusting the torque level maintained.

13. In a machine for harvesting crop which includes structure means, power means operable at substantially a constant speed, variable ratio transmission means operably connected to said power means and adapted to propel the structure means at variable ground speed, crop handling means driven at substantially a constant speed by said power means, the improvement which comprises, torque sensing means adapted to sense the torque transmitted from said power means to said crop handling means independent of the torque transmitted to propel the structure, and means responsive to the torque sensing means and operably connected to the transmission means to vary the ground speed of the structure to maintain a constant torque transmitted from the power means to the crop handling means, power sensing means operably connected between said power means and said torque sensing means to limit the maximum torque transmitted from said power means to said crop handling means thereby maintaining the horsepower used within the maximum horsepower capabilities of the power means.

14. In a machine for harvesting crop which includes structure means, power means operable at substantially a constant speed, variable ratio transmission means operably connected to said power means and adapted to propel the structure means at variable ground speed, crop handling means driven at substantially a constant speed by said power means, the improvement which comprises, torque sensing means adapted to sense the torque transmitted from said power means to said crop handling means independent of the torque transmitted to propel the structure, said torque sensing means including shaft means operably connected to said crop handling means, power transmitting means journalled with respect to said shaft means, said shaft means and said power transmitting means being relatively rotatable, resilient means interposed between said shaft means and said power transmitting means adapted to transmit the torque from power transmitting means to the shaft means, and indicating means responsive to the relative angular position of the power transmitting means and the shaft means, and an automatic control means responsive to the indicating means and operating the fluid pressure actuating means to maintain torque at the crop handling means by varying speed of the machine.

References Cited in the file of this patent

UNITED STATES PATENTS

| | | |
|---|---|---|
| 2,611,227 | Keller | Sept. 23, 1952 |
| 2,639,569 | Pasturczak | May 26, 1953 |
| 2,913,878 | Rue | Nov. 24, 1959 |